United States Patent [19]

Bruhn

[11] 4,280,713
[45] Jul. 28, 1981

[54] TRAILER HITCH

[75] Inventor: Larry C. Bruhn, Springfield, Oreg.

[73] Assignee: LBF Properties, Inc., Springfield, Oreg.

[21] Appl. No.: 21,168

[22] Filed: Mar. 15, 1979

[51] Int. Cl.³ .............................................. B60D 1/06
[52] U.S. Cl. ............................ 280/415 A; 280/490 R
[58] Field of Search ............... 280/415 R, 415 A, 417, 280/490 R, 491 R, 491 E, 495, 497, 500, 501, 504, 505

[56] References Cited

U.S. PATENT DOCUMENTS

| 2,827,307 | 3/1958 | Osborn | 280/415 A |
| 3,471,171 | 10/1969 | Peterson | 280/497 |
| 3,717,362 | 2/1973 | Johnson | 280/415 A |
| 3,922,006 | 11/1975 | Borges | 280/415 A |

FOREIGN PATENT DOCUMENTS 108095 6/1938 Australia .............................. 280/415 A Primary Examiner—Randolph A. Reese
Assistant Examiner—Randall A. Schrecengost
Attorney, Agent, or Firm—Eugene M. Eckelman

[57] ABSTRACT

A first body member is arranged to be secured on a vehicle and has an outwardly facing socket. A second body member is provided, and this member has an inwardly facing socket. A connecting neck has opposite ends arranged to be received in the sockets of the first and second body members, the neck in one embodiment being straight to provide a straight hitch on a vehicle and the neck in another embodiment having a vertical body portion and oppositely extending ends to provide a drop hitch. The second body member has a pair of hitch coupler portions on opposite surfaces thereof, and this body member has a pair of adjusted mounted positions on the neck so that one or the other of the hitch coupler portions can be used conveniently.

3 Claims, 6 Drawing Figures

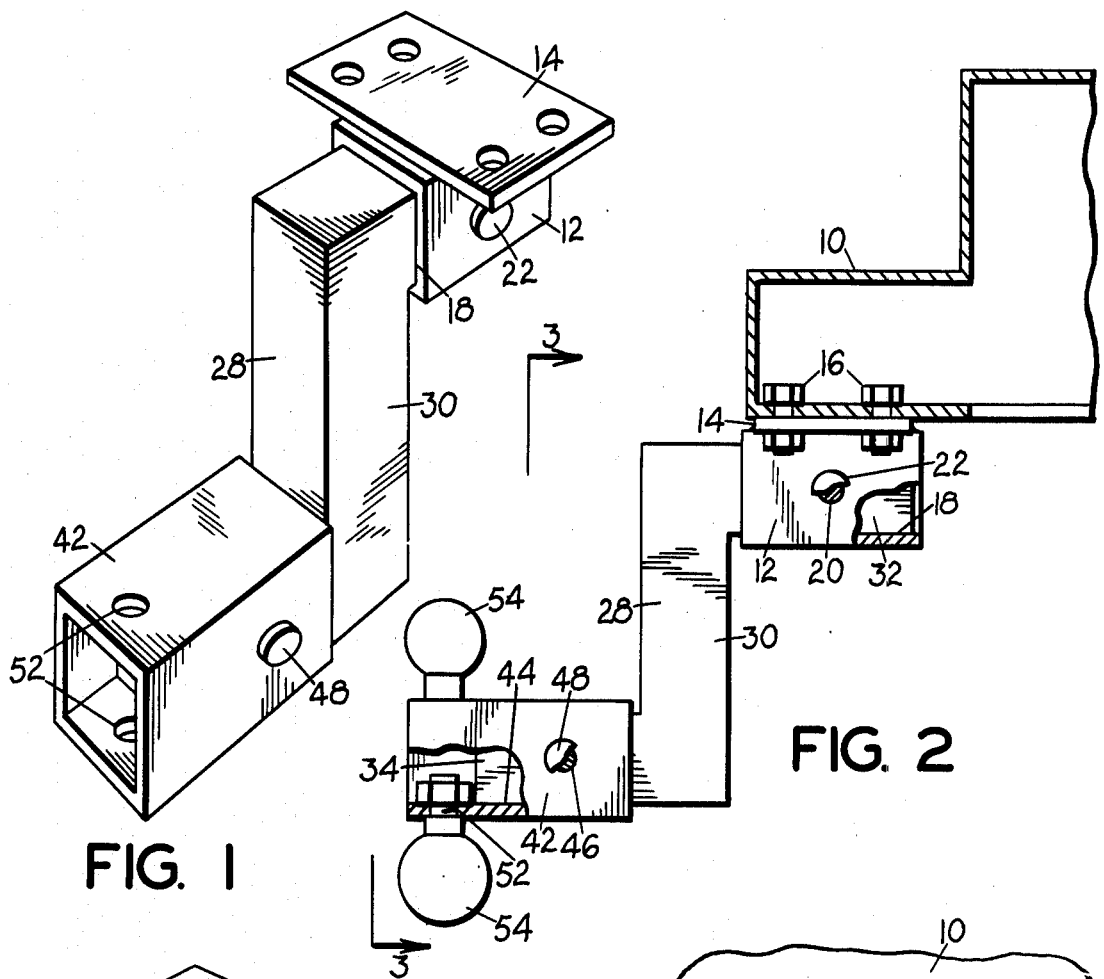
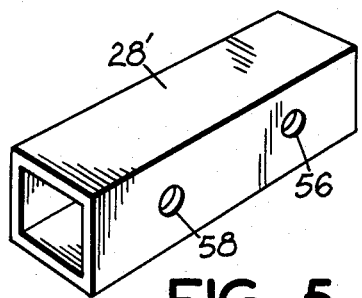
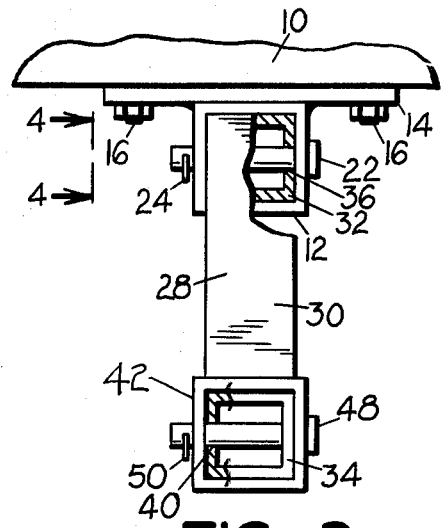
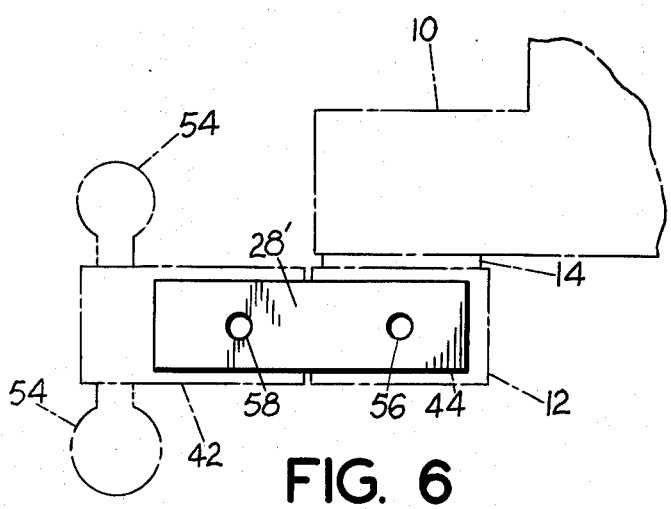
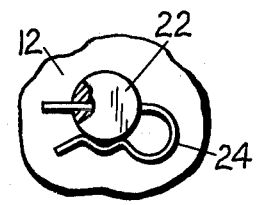

4,280,713

TRAILER HITCH

FIELD OF THE INVENTION

This invention relates to new and useful improvements in trailer hitches.

SUMMARY OF THE INVENTION

According to the present invention and forming a primary objective thereof, a trailer hitch is provided that is capable of holding a pair of different size coupler portions, such as hitch balls, to increase the versatility of the hitch and furthermore that is capable of providing a straight pulling connection or a drop pulling connection.

In carrying out these objectives, a first body member has means arranged to secure it to a vehicle. A second body member is also used that has a pair of hitch coupler means on opposite sides thereof, and connecting means are arranged to connect said second body member to said first body member in a pair of adjusted positions for using one or the other of said pair of hitch coupler means. The connecting means comprises a neck which may have a vertical offset to provide a drop connection or which may be straight for providing a straight connection.

The invention will be better understood and additional objects and advantages will become apparent from the following description taken in connection with the accompanying drawings.

BRIEF DESCRIPTION OF THE DRAWINGS

FIG. 1 is a perspective view of a trailer hitch embodying the instant invention, this view illustrating a first use of the invention;

FIG. 2 is a side elevational view of the invention, a portion of this view being broken away;

FIG. 3 is a front elevational view taken on the line 3—3 of FIG. 2, a portion of this view also being broken away;

FIG. 4 is a fragmentary elevational view taken on the line 4—4 of FIG. 3;

FIG. 5 is a perspective view of a neck portion which illustrates another use of the invention; and FIG. 6 is a side elevational view of the structure of FIG. 5 with portions of associated structure being shown in broken lines.

DETAILED DESCRIPTION OF A PREFERRED EMBODIMENT

The present hitch is adapted to be associated with a pulling vehicle, and with reference first to FIG. 2, it can for example be secured to the underside of the rear bumper 10 of a pickup truck. The hitch includes a first body member 12, also seen in FIGS. 1 and 3, having an integral mounting plate 14 by means of which the body member can be secured to the bumper such as by bolts 16. Member 12 has a socket portion 18 which opens to the rear relative to the vehicle. For efficiency of manufacture, the member 12 may be formed of rectangular tubular stock.

Body member 12 has opposite side apertures 20 arranged to receive a lock pin 22 associated with a removable fastener 24, FIG. 4, securely holding the pin 22 in place but at the same time allowing ready removal of the said pin.

First body member 12 is arranged to be releasably connected to a neck or bar 28 which in the embodiment of FIGS. 1–3 includes a vertical body portion 30 with upper and lower oppositely extending projections 32 and 34, respectively. Projection 32 is dimensioned and arranged to telescopically fit snugly within socket 18, and this projection has side apertures 36 located selectively to align with apertures 20 whereby the neck 28 is arranged to be releasably attached to the body member 12 by the lock pin 22.

Projection 34 also has opposite apertures 40, and this projection is arranged to be telescopically received in a second body member 42 which similar to body member 12 can be constructed of tubular stock so as to provide an inner hollow or socket portion 44. Socket portion 44 opens toward the towing vehicle for receiving the projection 34. Body member 42 has side apertures 46 arranged for alignment with apertures 40 for receiving a lock pin 48 associated with a removable fastener 50 of the same construction as that shown in FIG. 4 and arranged to securely hold the pin 48 in place but at the same time arranged to allow ready removal of the said pin.

Second body member 42 has upper and lower apertures 52 at its rearward end each arranged to receive a hitch ball 54 in turn arranged for attachment to the socket portion of a trailer hitch. By means of the present arrangement, a pair of hitch balls can be secured on the body member 42 as shown in FIG. 2 and the operator thus can have two hitch balls on the hitch readily available for use. This provides a convenience to an operator who for example may be working with hitch sockets of different sizes required by light and heavy towing assemblies. To convert from one type of towing assembly to the other the operator merely has to remove pin 48 and turn the body member 42 over.

The structure of neck 28 with its vertical body portion 30 provides a pulling connection in a lower plane than the connection with the vehicle, thus providing a drop hitch for use with vehicles that are elevated more than normal such as four wheel drives.

FIGS. 5 and 6 show use of the hitch for vehicles of normal elevation above the ground. In this form, the first and second body members 12 and 42 are identical to that of the FIG. 1 embodiment. The connecting neck between these two members, however, comprises a straight bar 28'. This bar has two apertures 56 and 58, therethrough, these apertures being arranged to receive pins 22 and 48, respectively, to provide the straight hitch connection.

It is to be understood that the forms of my invention herein shown and described are to be taken as preferred examples of the same and that various other changes in the shape, size and arrangement of parts may be resorted to without departing from the spirit of my invention, or the scope of the subjoined claims. For example the mounting means 14 may take different shapes to provide custom attachment to various types of vehicles. Also, it is apparent that if additional size or spare coupler means 54 are required, the other sides of the second body member 42 may be provided with apertures 52 as well.

Having thus described my invention, I claim:

1. A trailer hitch comprising
   (a) a first body member of tubular shape having an open rearward end to provide a socket within said first body member,
   (b) means on said first body member arranged to secure it to a vehicle, (c) a second body member of tubular shape having defining side portions and having an open forward end to provide a socket within said second body member, (d) two or more hitch coupler means on different side portions of said second body member arranged one at a time to provide a connection with a vehicle to be towed, (e) a neck portion having opposite end portions one of which is arrranged to project into and fit snugly within said socket formed by said first body member and the other of which is arranged to project into and fit snugly within said socket formed by said second body member, (f) removable connecting means on one end of said neck portion and on said first body member removably connecting said neck portion in said first body member, (g) and removable connecting means on the other end of said neck portion and on said second body member removably connecting said neck portion in said second body portion, (h) said connecting means on said other end of said neck portion and on said body member providing two or more rotated positions of said second body member on said neck portion for using a selected one of said hitch coupler means at a time.

2. The trailer hitch of claim 1 wherein said neck portion comprises a straight bar-like member arranged for providing a straight pull connection between said two body members.

3. The trailer hitch of claim 1 wherein said neck portion comprises a vertical body portion and oppositely extending horizontal portions at the top and bottom arranged for providing a drop hitch pull connection between said body members.

* * * * *